United States Patent [19]
Jepsen

[11] 3,848,842
[45] Nov. 19, 1974

[54] IMPINGEMENT SHIELD
[76] Inventor: Milford L. Jepsen, 18018 Jersey Ave., Artesia, Calif. 90701
[22] Filed: Mar. 14, 1973
[21] Appl. No.: 341,075

[52] U.S. Cl............ 248/204, 280/154.5 R, 267/70, 267/71
[51] Int. Cl.......................................... F16m 13/00
[58] Field of Search............. 280/154.5 R; 248/204; 267/70, 71

[56] References Cited
UNITED STATES PATENTS

| | | | |
|---|---|---|---|
| 1,642,367 | 9/1927 | Hand et al. | 248/204 X |
| 2,683,013 | 7/1954 | Amundson | 248/145 |
| 2,801,867 | 8/1957 | Childreth | 280/154.5 R |
| 2,865,655 | 12/1958 | Boysen | 280/154.5 R |
| 2,970,849 | 2/1961 | Betts | 280/154.5 R |
| 3,224,791 | 12/1965 | Sogoian | 280/154.5 R |
| 3,401,953 | 9/1968 | Prohl et al. | 280/154.5 R |

Primary Examiner—William H. Schultz
Attorney, Agent, or Firm—J. Carroll Baisch

[57] ABSTRACT

The present invention relates to an impingement shield (sometimes known as a mud guard or a splash fender) for a truck, trailer, tractor, or a similar vehicle.

The disclosure teaches that such a shield may be mounted in a manner that the stresses to which it is usually subjected are transferred to a mechanical structure designed to absorb these stresses. The disclosed structure provides a fail safe arrangement that is long lived and inexpensive.

4 Claims, 5 Drawing Figures

PATENTED NOV 19 1974
3,848,842
SHEET 1 OF 2
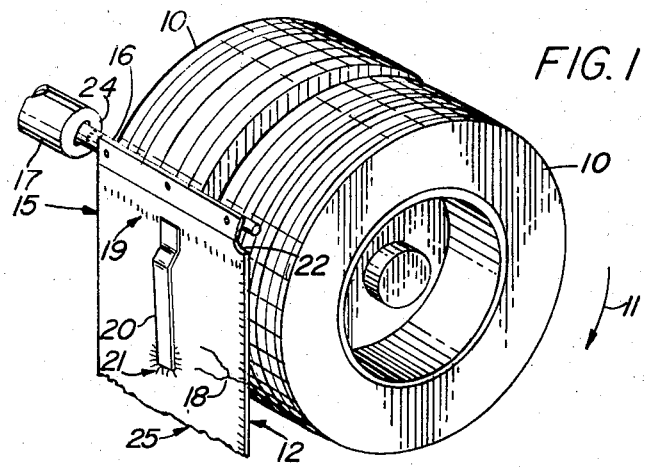
FIG. 1
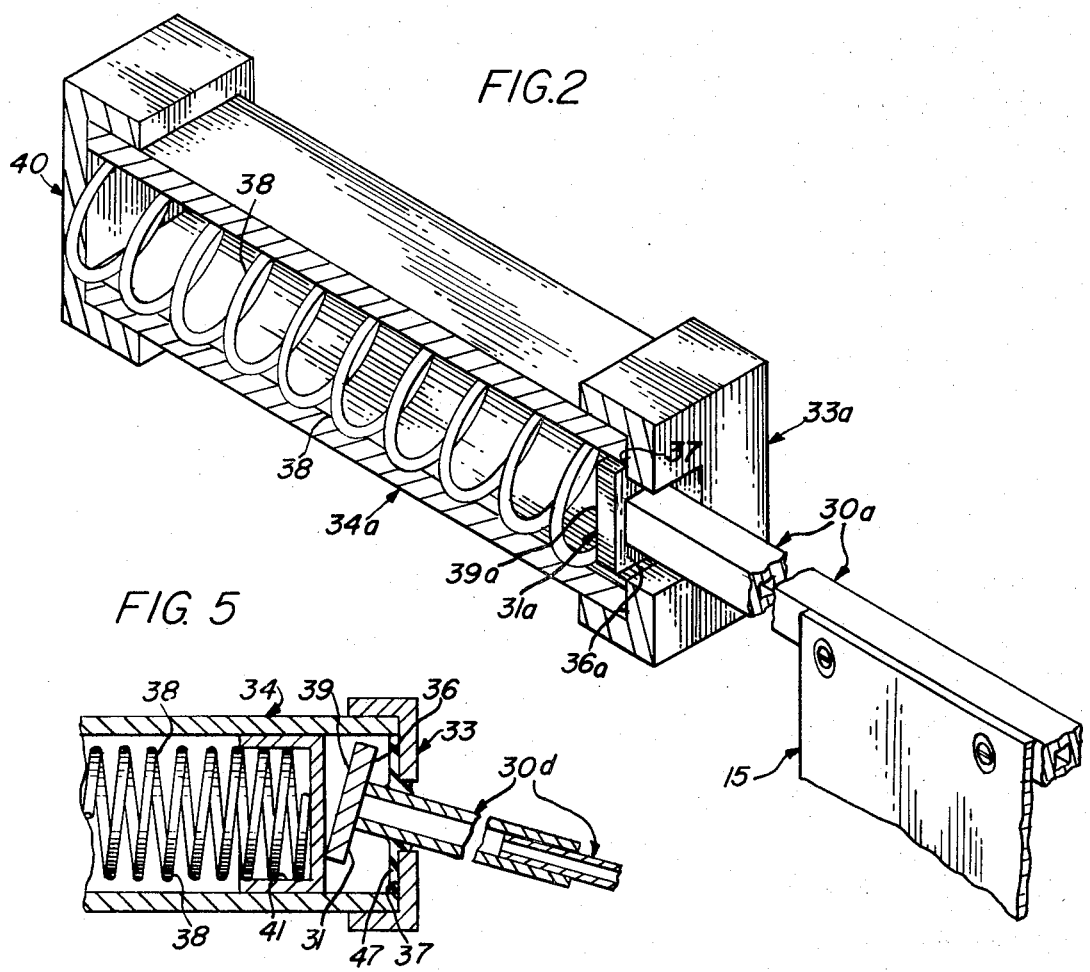
FIG. 2
FIG. 5

PATENTED NOV 19 1974

IMPINGEMENT SHIELD

BACKGROUND

As is well known, the tires of automotive vehicles have a configurated tread portion that provides driving traction with the roadway or the ground; and this configurated tread portion generally comprises a plurality of grooves and raised rubber ridges. Whereas each tire manufacturer has his own particulaar tread design, all tread configurations are designed for the optimal compromise of providing traction, stopping ability, tire wear, non-skid characteristics, starting during snowy or highly slippery conditions, etc.

It so happens that the large tires used by tractors, trucks, trailers, semi-trailers, and the like have grooves of such a size that appreciably sized stones are readily embedded into the grooves. It is a characteristic of such tires that the grooves are compressed when they contact the roadway — thus embedding the stones; and that the grooves dilate as they leave the roadway — thus freeing the stones. Thus, as the tire rotates, the formerly embedded stones are freed, to be hurled violently in an upward backward direction. These hurled stones are actually dangerous missiles to following traffic; having caused accidents, broken wind-shields, injured drivers, deformed car bodies, etc.

An additional — but secondary — characteristic of these tires, is that they tend also to hurl mud and clots of dirt in the same manner, but for present day high speed driving along good roads, the predominant danger is from stones — rather than from mud, dirt, or splash.

As a result of these stone hurling characteristics, most states have laws that require a protective safety device for intercepting such hurled stones; and prior art "impingement shields" (also called mud guards, splash guards and fenders). for this purpose have taken the form of vertically supported sheets of resilient material that hang — in the form of a curtain — behind the tires for the purpose of intercepting such hurled objects. While such impingement shields have been widely accepted, they are far from satisfactory; and the reasons for their unsatisfactory operation will be discussed more fully later.

It may therefore be understood that an improved impingement shield is desirable.

For convenience, the following presentation will use the term "truck" to include trucks, tractors, trailers, semi-trailers and the like.

OBJECTIVES AND DRAWINGS

It is, therefore, the primary objective of the present invention to provide an improved impingement shield.

It is another objective of the present invention to provide an impingement shield that is long lived.

It is still another objective of the present invention to provide an improved impingement shield that is exposed to minimal stresses and distortions.

It is a further objective of the present invention to provide an improved impingement shield mounting.

It is a still further object of the present invention to provide an improved impingement shield that is self orienting.

The attainment of these objectives and others, will be realized from a study of the following description; taken in conjunction with the drawings of which:

FIG. 1 shows a composited illustration of prior art impingement shields;

FIG. 2 shows a pictorial view of the basic concept of the present invention;

FIG. 5 shows the operation of the present invention.

SYNOPSIS

Figure 3:
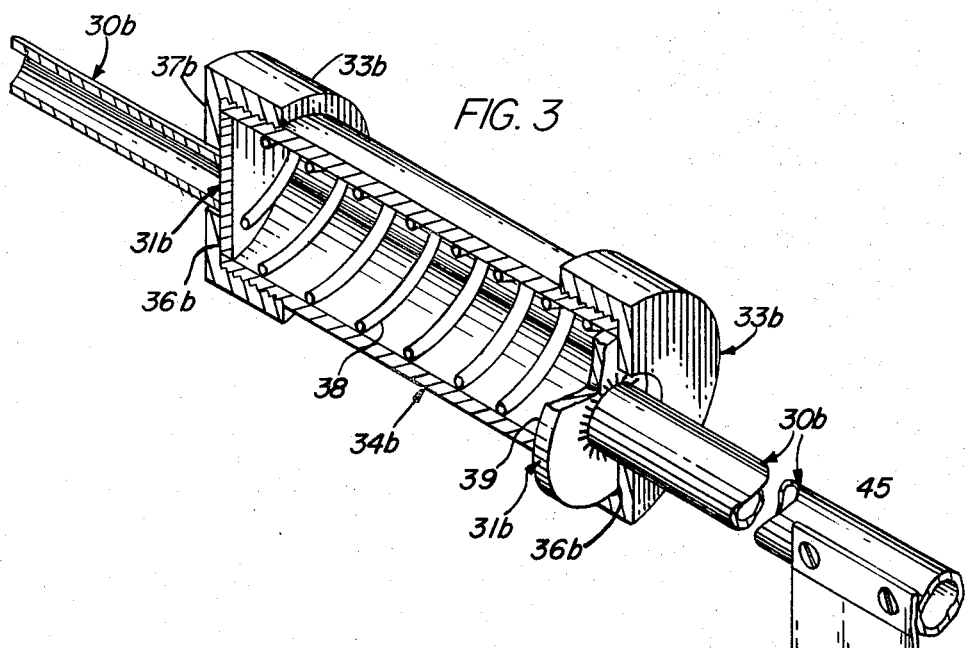
FIG. 3 shows a pictorial invention of another embodiment of the present invention.

Broadly speaking, the present impingement shield mounting utilizes a protective housing that contains all of the working components; so that they are protected from the destructive elements such as smog, water, ice, and the like. One or more resilient members, that may take the form of helical compression springs, apply their pressure in such a manner that the rod that supports the impingement shield is normally held in a substantially horizontal orientation. Any excess disturbing force tends to be absorbed by the mechanical structure rather than by the shield itself. As soon as the disturbing forces are reduced, the impingement shield assumes its normal orientation.

INTRODUCTION

The composited arrangement of FIG. 1 will be used to illustrate a number of the shortcomings of present shield mounting arrangements.

As discussed above, most trucks use impingement shields — generally behind each rear wheel; and the composited view of FIG. 1 shows tires 10 to have a tread portion having the previously discussed grooves that tend to embed stones. As the tires 10 rotate in the direction indicated by the rotational arrow 11, the freed stones tend to be hurled upward and backward as indicated by trajectory arrow 12. The curtain like impingement shield 15 is suspended behind tires 10 on a support rod 16 that is mounted to the truck by means such as a bracket 17. Thus, the impingement shield 15 is in such a position that it acts to intercept the hurled stones.

Some of the described stone hurling even occurs — although not too frequently — at the top of the tire; hurling stones in a forward direction. Therefore, some trucks have impingement shields positioned in front of their forward tires to protect the tractor tanks and other equipment from such forwardly hurled stones.

In general, trucks cannot utilize metallic fenders or mud guards for a number of technical reasons; among which are the fact that the truck chassis is usually manufactured by a different manufacturer than the one who makes the truck body. Thus, it is generally impossible to know in advance the size of the tires that will be used, the location of the wheels relative to the truck body, the problems associated with changing the large tires, etc.

It should be pointed out that serious stone hurling problems do not arise in the case of passenger automobiles because (1) their tire treads have grooves that are too small to embed stones, and (2) the weight of the passenger cars is too low to embed appreciably sized stones. Therefore, stone release and stone hurling are not problems of passenger automobiles.

TORSION STRESS

While the truck is moving, the impingement shield is buffeted by stones, by wind currents, by lurching of the truck, by gusts of wind produced by passing or passed vehicles, etc.; and as a result, the impingement shield 15 of FIG. 1 is constantly being twisted, bent, curved, and otherwise torsionally distorted. One prior art solution for these torsional stresses is to make the shield 15 of a resilient material, such as a rubber or a plastic — although many of the presently used materials tend to deteriorate because of smog, vapors, exhaust fumes, etc. In addition, the impingement shield may be made heavier, thicker, given a rigidifying periphery, etc.

OBSTACLE STRESS

It is well known that many trucks of the discussed type are loaded and unloaded by having the trucks back into a loading zone in such a manner that the bed of the truck either abuts or extends over a loading dock. Occasionally, during such a backing manuever, a portion of the impingement shield 15 will abut a portion of the loading dock or some other obstacle; and the resultant "obstacle" stress tends to distort and/or tear the impingement shield as indicated at 18 of FIG. 1.

SAILING STRESS

When the truck is moving forward, the resultant air pressure causes the low unfastened end of impingement shield 15 to rise — this being known as "sailing"; and the resultant sailing position of the shield 15 produces sailing stress in shield 15 adjacent to the support rod 16. These sailing stresses, in turn, tend to produce sailing cracks as indicated at 19.

ANTI-SAILING WEAR

FIG. 1 illustrates an anti-sailing arm 20 that is pivotally mounted in such a manner that before the shield 15 sails too high to become ineffective, the anti-sail arm 20 reaches the end of its pivotal movement — and thus limits further sailing of shield 15. The end of the anti-sailing arm 20 — when such is used — tends to produce an anti-sailing wear spot indicated at 21 of FIG. 1.

WIND STRESS

Exposed unsupported corners of the shield 15 tend to be torn off by the wind, as indicated at 22 of FIG. 1.

SHIELD WEAR

It is obvious that in order for the impingement shield 15 to be most efficient in its interception of hurled stones, it is desirable for its lower end to be as close as possible to the roadway; but, unfortunately, a loaded truck sags toward the road, and the lower end of the impingement shield is eventually worn off as indicated at 25 of FIG. 1.

SHIELD TEAR

The impingement shield 15 and its support arrangement is subjected to still another type of abuse, as follows.

Assume that the shield is originally of the correct length. Now, when the truck is loaded, and sags, the end of shield 15 tends to drag along the ground as explained above. However, while the truck is moving forward, there is a small amount of sailing effect; and this raises the end of the shield to minimize end wear.

On the other hand, when the loaded truck is backing slowly into a loading zone, the sagging of the truck and the long impingement shield, co-act to produce a situation wherein the end of the shield actually drags along on the ground. The backing-up of the truck causes the rear tires to actually travel up onto the shield; and further backing action produces a tension stress in the shield — and this tension eventually tears the shield across its entire width. This explains why shield 15 of FIG. 1 is shown to be so short and jagged.

As a result of the above discussed factors that affect the impingement shields, there have been a number of different proposals overcoming the problems. Many of these proposals used a type of shield mounting that may be designated as the "flexible" type; these envisioning a mounting that is designed to flex in accordance with the disturbing forces.

A first class of flexible mountings for the impingement shields involves the use of flexible chains for supporting the shields. Unfortunately, these chain supports tended to apply such concentrated stresses that the shelds tended to tear at their support points.

A second class of flexible mountings for the impingement shields involved the use of springs, chains, cables, levers, etc., that were adapted to flex under the disturbing forces; and to return to their not normal state when the disturbing forces were reduced. Unfortunately, most of these second class systems had their working components exposed; thus leading to rapid degeneration and to mal-function when the components were wet or frozen in place. Moreover, practically all of the second class of flexible shield mountings were not of the "fail safe" type. More specifically, their tension elements were usually extension springs; and under severe disturbing forces, these springs tended to stretch out of shape — and were thus useless for further usage.

Because of the problems associated with the flexible type of shield mountings, the most widely accepted system was the inflexible, or "fixed", type of shield mounting; these systems using the concept of rigidly fastening or affixing the upper edge of the shield to a portion of the truck. Unfortunately, these fixed systems of shield mounting placed great stresses on the shields themselves; so that the impingement shields became progressively more expensive — without really solving the problems. Therefore, most impingement shields are mounted by having their upper edges securely fastened to the truck or to a support rod.

As will be shown later, the disclosed impingement shield overcomes most of these shortcomings; minimizes most of the others; and permits the use of a less expensive shield.

The basic concept of the present invention will be understood from the cut-away pictorial view of FIG. 2; this showing a portion of an impingement shield 15 and its mounting. As indicated in FIG. 2, shield 15 is mounted to a support rod 30a — which may be, typically, a 1 inch square cross sectional tube, about twenty-five inches long to support a 24 inch wide impingement shield 15.

In FIG. 2, support rod 30a is affixed — as by welding — substantially perpendicular to the center of a pressure plate 31a. The support rod 30a projects outwardly through a center aperture of a collar like front end 33a of a protective housing 34a — which may have a typical width of about two and one-half inches, and a typical length of about six inches. The outer surface 36a of plate 31a abuts the rear surface 37a of the collar like front end 33a; Abutment presssure being provided by means such as a helical compression spring 38. End pieces 33a and 40 are attached in any suitable manner. The housing 34a is mounted on the truck in any suitable manner (not shown but including welding, bolting, riveting, etc.) Thus, the support rod is held in a normally horizontal orientation.

Before discussing the operation of the invention, attention is directed to FIG. 3, which shows another shield mounting. Here, the support rod 30b takes the form of a cylindrical tube; and is affixed to a pressure plate 31b that has a circular disc like configuration. Housing 34b is also indicated to be cylindrical; and its end piece 33b is indicated to be attached to the housing body 34b by a threaded arrangement or some other suitable attachment.

It should be noted that the shield mounting of FIGS. 1 and 3 may be made double ended by having a second support rod projecting from the rear end thereof as indicated in FIG. 3. The second support rod may be similarly affixed to a second pressure plate as discussed above; and supports a second impingement shield (not shown).

Figure 4:
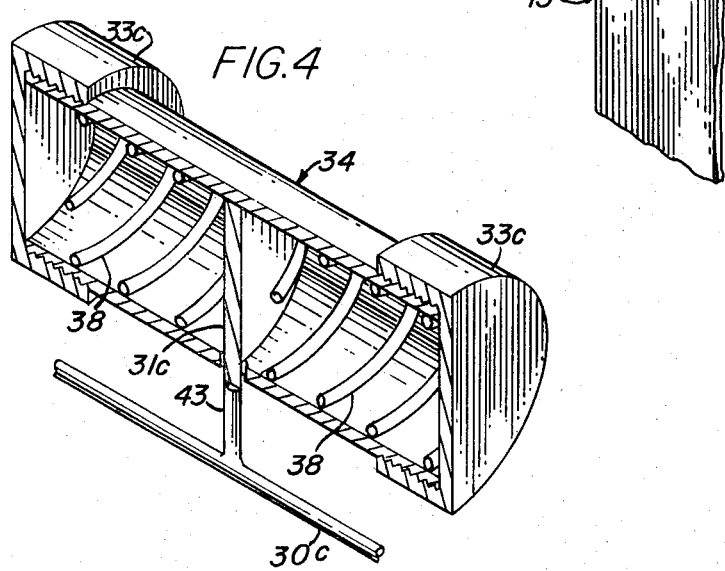
FIG. 4 shows still another embodiment.

FIG. 4 shows still another embodiment of the present invention. As indicated, this comprises a protective housing 34c having end pieces 33c that are similar to those described previously — except that end pieces 33c are solid ended, rather than being collar like.

The support rod 30c may be L-shaped or T-shaped to support an impingement shield (not shown); a support rod arm 43 being affixed to pressure plate 31c. The embodiment of FIG. 4 has two helical springs 38; each spring having one of its ends abutting a respective end piece 33c, while the other ends of the springs abut opposite surfaces of plate 31c.

OPERATION

RELEASE OF TORTIONAL AND OPTIMAL STRESSES

The operation of the present invention may now be discussed.

It will be noted — with reference to FIGS. 2, 3 and 4 — that the impingement shield 15 is suspended from a support rod 30 that is resiliently held in a normally horizontal orientation by the longitudinally acting springs 38.

It was pointed out above that the impingement shield 15 is exposed to a number of different distortions. Directing attention first to the torsional stresses and the obstacle stresses, it will be recalled that these tend to twist and distort the shield — leading to a number of different types of cracking and tearing. When the torsional forces, acting on shield 15 become larger than the applied spring force, the shield rod plate assembly 15, 30, 31 assumes a different angular orientation — as indicated in FIG. 5. If desired, a sliding pressure sleeve 41 shown in FIG. 5 may be inserted into the housing 34 to receive the end of spring 38; and, since the pressure sleeve is constrained to a sliding motion, it assures a more positive application of the spring force to the pressure-plate 31. In this way, the torsional forces are absorbed by the mechanical structure comprising the support rod, the plate, the spring and the housing — rather than being absorbed by the shield itself. Thus, the shield is not stressed or torn. The entire shield and shield mounting returns to its normal orientation as soon as the torsional forces are reduced. Moreover, the flat surface abutment provides automatic seating for continued operation.

It will be obvious that the invention operates in the above described manner whether the torsional forces are horizontal, vertical, angled or composited.

RELEASE OF SAILING STRESS

It will be recalled that there is a sailing stress introduced by the wind currents when the truck is moving; and that in the prior art shield installations, this stress tended to produce sailing cracks. The arrangement of FIG. 3 minimizes these stresses in the following manner.

When shield 15 sails, it assumes a sloping nonvertical orientation; and in the past, the shield had to bend or curve to absorb the resultant sailing stress. In FIG. 3, the shield's non-vertical sailing reorietation causes the support rod 30b to pivot around its longitudinal axis, as indicated by arrow 45; and this rod pivoting action causes the plate 31b to also pivot around its central axis. It will be noted that the rod plate assembly 30/31 is relatively free to pivot rotationally in this way; the only limitation to the rotational pivotal action being the friction between the abutting surfaces 36b and 37b, and the friction between the end of spring 38 and the inner surface 39b of plate 31b.

Thus, the impingement shield 15 may rotationally pivot the rod plate assembly to an extent determined by the sailing force and the above discussed friction. The frictional forces may be easily controlled by a number of co-acting factors that include the spring pressure and the co-efficient of friction between the above discussed surfaces — the co-efficient of friction, in turn, being controllable by means ranging from the use of bearings to the roughing of the surfaces. In this way, the impingement shield 15 is permitted to sail as high as desired; the sailing stress being absorbed by the mechanical interaction of the described elements, rather than by the shield.

It should be noted that the permitted sailing obviates the need for an anti-sail arm and its attendant wearing of the shields.

RELIEF OF CORNER TEARS

In order to avoid corner tearing of the shields, it may be desirable to provide support rods 30 of different lengths; or, alternatively, to provide support rods that are telescopic to accommodate shields of different widths — as indicated at 30d of FIG. 5.

RELIEF OF TRUCK SAGGING

It was pointed out above that one of the difficulties with the use of impingement shields arose when a loaded truck was backed-up. The most satisfactory solution to date has been the introduction of a buzzer that sounds an alarm when the truck is loaded and the transmission is placed in reverse gear. This buzzer alerts the driver that a dangerous situation exists, and he thereupon rolls up the shield upon its support rod.

WEATHERPROOFING

It will be realized from the above discussion that all of the working elements are enclosed in a protective housing; so that, as a result they are protected from the weather, from stones, from being iced in place, etc. If desired, improved weatherproofing may be provided by the used of a suitable sealing gasket such as indicated at 47 of FIG. 5. The use of such a gasket practically assures that the working elements are completely protected from the weather and other deteriorating conditions.

SUMMARY

The disclosed invention has a number of important advantages over prior art devices of this type. First of all, the disclosed apparatus is enclosed in a protective housing. Second, the working parts of the disclosed apparatus are protected from water, from ice, from mud, from stones, etc., and cannot be frozen in place — and so made inoperative. Third, the springs used are of the compressive fail-safe type, and cannot be overstretched out of shape. Fourth, due to the disclosed structure, the only stressed elements are the springs, and the disclosed apparatus is, therefore, practically safe from fatigue failure. Fifth, the restoring force is produced by compression springs that are exerting their forces in a longitudinal manner. Sixth, the disclosed apparatus has an automatic seating feature that assures its automatic return to normal operating position. Seventh, due to the proctective housing, corrosion and exposure to the weather and such elements is minimized, so that the apparatus is practically weatherproof. Eighth, there is no danger of jamming. Ninth, no hinges are required. Tenth, no hooks or other stress concentrations are used. And finally, the disclosed apparatus is extremely simple, inexpensive, and requires practically no maintenance.

I claim:

1. Apparatus for mounting an impingement shield, comprising:
   a housing;
   a support rod adapted to have an impingement shield supported therefrom;
   said support rod having a pressure plate affixed to said support rod to define a rod/plate assembly;
   said pressure plate being positioned within said housing;
   means for resiliently orienting said support rod in a normally horizontal orientation whereby said support rod and said supported shield may move under the influence of a disturbing face and for resiliently reorienting said support rod and said supported shield when said disturbing force is removed;
   said housing having an aperture therein;
   said support rod being positioned to project out of said housing through said aperature;
   said resilient orienting means comprising at least one compression spring positioned in said housing, with one end of said spring positioned to press against a surface of said plate, and the other end of said spring positioned to press against a wall of said housing;
   said housing having at least one collar like end piece having said aperture;
   said plate being positioned in said housing with the outer surface of said plate abutting the inner surface of said collar like end piece, with said support rod projecting out of said housing through said aperture;
   said compression spring urging said outer surface of said plate against said inner surface of said end piece for causing said support rod to project outwardly through said aperture of said collar like end piece in a normally horizontal orientation.

2. The combination of claim 1, wherein said housing has a second end piece;
   said other end of said spring being positioned to press against said second end piece.

3. Apparatus for mounting an impingement shield, comprising:
   a housing;
   a support rod adapted to have an impingement shield supported therefrom;
   said support rod having a pressure plate affixed to said support rod to define a rod/plate assembly;
   said pressure plate being positioned within said housing;
   means for resiliently orienting said support rod in a normally horizontal orientation whereby said support rod and said supported shield may move under the influence of a disturbing force and for resiliently reorienting said support rod and said supported shield when said disturbing force is removed;
   said housing having an aperture therein;
   said support rod being positioned to project out of said housing through said aperture;
   said resilient orienting means comprising at least one compression spring positioned in said housing, with one end of said spring positioned to press against a surface of said plate, and the other end of said spring portioned to press against a wall of said housing;
   said aperture being located in one of the longitudinal walls of said housing;
   said plate being positioned in said housing with one surface of said plate toward one end of said housing, and the other surface of said plate toward the other end of said housing, said resilient orienting means comprising a second compression spring positioned in said housing with one end of said second spring positioned to press against the other surface of said plate, and the other end of said spring positioned to press against the other wall of said housing;
   said resilient orienting means causing said support rod to project outwardly through said aperture in a normally horizontal orientation.

4. Apparatus for mounting an impingement shield, comprising:
   a housing;
   a support rod adapted to have an impingement shield supported therefrom;
   said support rod having a pressure plate affixed to said support rod to define a rod/plate assembly;
   said pressure plate being positioned within said housing;
   means for resiliently orienting said support rod in a normally horizontal orientation whereby said support rod and said supported shield may move under the influence of a disturbing force and for resiliently reorienting said support rod and said suppported shield when said disturbing force is removed;
   said housing having an aperture therein;
   said support rod being positioned to project out of said housing through said aperture;
   said resilient orienting means comprising at least one compression spring positioned in said housing, with one end of said spring positioned to press against a surface of said plate, and the other end of said spring positioned to press against a wall of said housing;
   a sliding pressure sleeve positioned in said housing with the end of said pressure sleeve positioned between said surface of said plate and the adjacent end of said spring.

* * * * *